US009860047B1

(12) United States Patent
Pawar et al.

(10) Patent No.: US 9,860,047 B1
(45) Date of Patent: Jan. 2, 2018

(54) USER EQUIPMENT RELAY SELECTION

(71) Applicant: Sprint Spectrum LP, Overland Park, KS (US)

(72) Inventors: Hemanth Pawar, Brambleton, VA (US); Chunmei Liu, Great Falls, VA (US); Krishna Sitaram, Chantilly, VA (US); Pratik Kothari, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 69 days.

(21) Appl. No.: 14/709,750

(22) Filed: May 12, 2015

(51) Int. Cl.
*H04W 48/04* (2009.01)
*H04L 5/00* (2006.01)
*H04L 1/00* (2006.01)
*H04W 76/02* (2009.01)
*H04L 12/26* (2006.01)
*H04L 12/851* (2013.01)
*H04W 88/04* (2009.01)

(52) U.S. Cl.
CPC .......... *H04L 5/0057* (2013.01); *H04L 1/0009* (2013.01); *H04L 43/0894* (2013.01); *H04L 47/24* (2013.01); *H04W 76/023* (2013.01); *H04W 88/04* (2013.01)

(58) Field of Classification Search
USPC ....................................................... 370/315
See application file for complete search history.

(56) References Cited

U.S. PATENT DOCUMENTS

| 8,189,465 | B1* | 5/2012 | Pawar | H04L 47/20 370/230 |
| 8,761,690 | B2 | 6/2014 | Kim et al. | |
| 8,848,593 | B1* | 9/2014 | Zhou | H04W 4/06 370/312 |
| 2009/0003261 | A1* | 1/2009 | Kim | H04B 7/2606 370/315 |
| 2012/0315841 | A1* | 12/2012 | Zhou | H04B 7/2606 455/11.1 |
| 2013/0012251 | A1* | 1/2013 | Roddy | H04W 28/08 455/509 |
| 2013/0176934 | A1 | 7/2013 | Malladi et al. | |
| 2013/0182555 | A1 | 7/2013 | Raaf et al. | |
| 2013/0195043 | A1 | 8/2013 | Chen et al. | |
| 2015/0023245 | A1 | 1/2015 | Du et al. | |

* cited by examiner

*Primary Examiner* — Edan Orgad
*Assistant Examiner* — Sithu Ko (57) ABSTRACT

Wireless devices with similar air-interface conditions (e.g., signal strength, modulation and coding scheme, etc.) can be configured to function as relays. To select which wireless device(s) to pick to function as a relay on behalf of an access node, the type of data traffic going to/from these devices is examined. This examination is used to determine which wireless device to select as a relay. In other words, when several wireless devices are situated so that they have similar radio frequency (RF) conditions, the type and/or amount of traffic they are sending or receiving is used to determine which of the wireless devices to select to function as a relay.

20 Claims, 7 Drawing Sheets

USER EQUIPMENT RELAY SELECTION

TECHNICAL BACKGROUND

Wireless communication networks are widely deployed to provide communication services to both fixed and mobile devices. These services can include voice, data, video, messaging, web browsing, etc. Wireless communication has certain advantages, such as mobility, over wired communications for accessing a network. Various wireless standards have been adopted or proposed for wireless networks. These standards include 802.11 (WiFi), 802.16 (WiMAX), TIA-856 (which is also known as Evolution-Data Optimized —EV-DO), and long term evolution (LTE). Additional standards such as the fourth generation communication system (4G) are also being pursued.

Because of transmit power regulations, interference, and/or radio wave propagation characteristics, a base station may be unable to provide some wireless devices (a.k.a., user equipment—UE) with coverage and/or a desired level of service (e.g., throughput, packet loss, etc.). One approach to improving coverage and/or service, particularly to user equipment near the edge of, or outside of, a base station's direct coverage area, is to relay communication between the base station and a wireless device via another wireless device. This solution, however, may burden the relaying wireless device in a way that causes problems with the service and/or coverage experienced by the relaying wireless device.

Overview

In an embodiment, a method of operating a communication system, includes determining that a first user equipment (UE) and a second UE can establish direct wireless links to a donor access node. Based on packet inspection of traffic associated with the first UE and the second UE, the types of traffic associated with the first UE and the second UE, respectively, are determined. Based on the types of traffic associated with the first UE and the second UE, the first UE configured to function as a relay for the donor access node.

In an embodiment, a communication system includes a donor access node and a processor. The donor access node is configured to establish direct wireless links with a first user equipment (UE) and a second UE. The first UE and the second UE being associated with corresponding air-interface conditions. The processor is configured to inspect packets from a first flow of data traffic communicated between the donor access node and the first UE. The processor inspects the packets from the first flow to determine a first profile associated with the first UE. Packets from a second flow of data traffic communicated between the donor access node and the second UE is also inspected to determine a second profile associated with the second UE. Based on the first profile and the second profile, the first UE is configured as a relay for the donor access node.

In an embodiment, a method of operating a communication system includes determining a first air-interface conditions classification that is associated with a first wireless link between a donor access node and a first user equipment (UE). A second air-interface conditions classification associated with a second wireless link between a donor access node and a second user equipment (UE) is also determined. Based on the first air-interface conditions classification corresponding to the second air-interface conditions classification, and based on inspecting attributes of data packets communicated with the first user equipment, the first user equipment is selected to function as a relay.

DETAILED DESCRIPTION

Mobile wireless devices can be used to relay communication between a fixed donor access node and other mobile wireless devices. This relaying of communication can be used to provide coverage extension, throughput enhancement, and/or other forms of improved service quality. Selecting a wireless device to be a relay that is busy, burdened, or otherwise has limits that affect its ability to function satisfactorily as a relay. This can result in poor service quality In an embodiment, when wireless devices with similar air-interface conditions (e.g., signal strength, modulation and coding scheme, etc.) can be configured to function as relays, the type of data traffic going to/from these devices is used to determine which one to select as a relay. In other words, when several wireless devices are situated so that they have similar radio frequency (RF) conditions, the type and/or amount of traffic they are sending and/or receiving is used to determine which of the wireless devices to select to function as a relay. For example, if one wireless device is receiving streamed video, and another wireless device is web browsing, and both are experiencing about the same signal strength, the wireless device that is web browsing would be selected to function as a relay because the video streaming requires more air-interface resources, and compute resources, than web browsing. Other examples are possible.

Figure 1A:
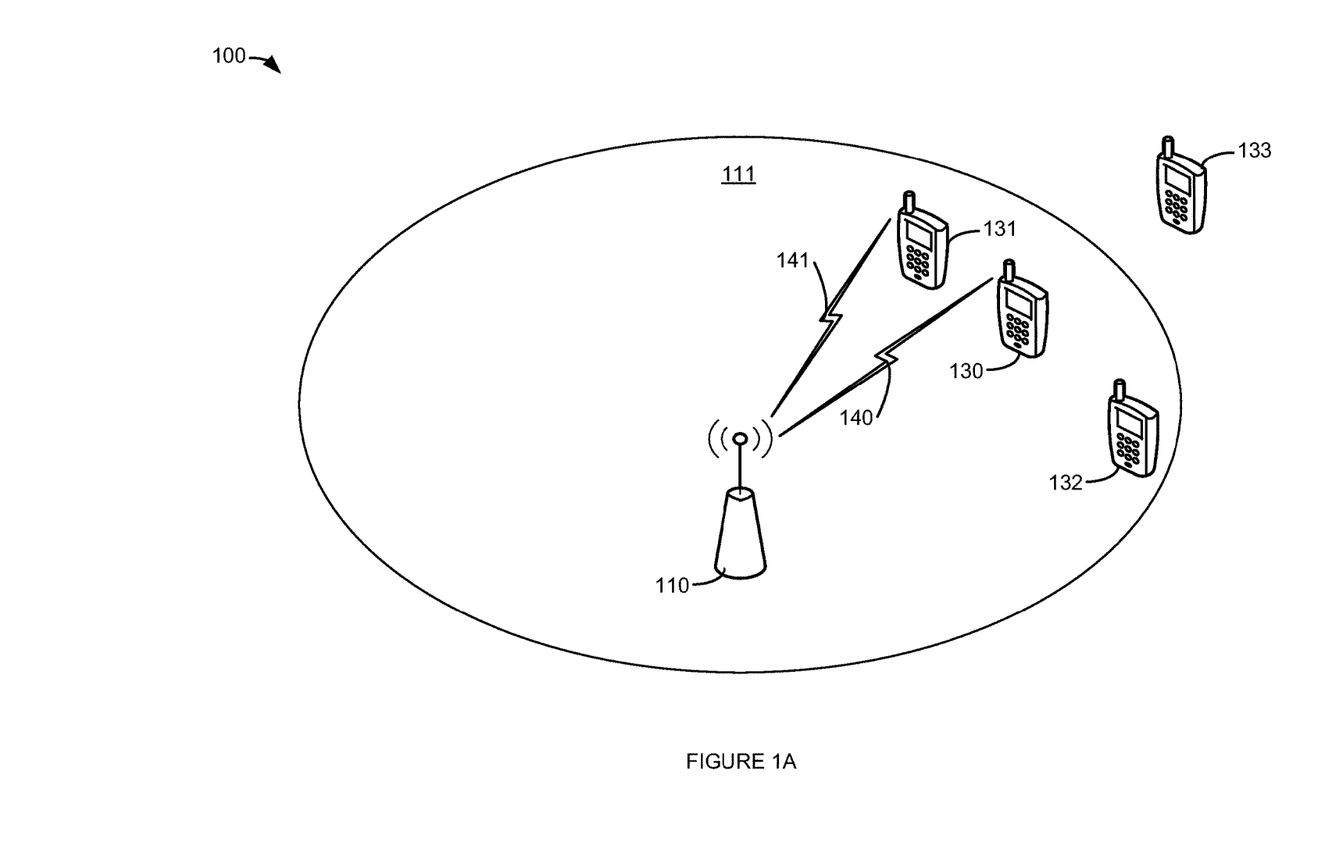
FIGS. 1A and 1B are block diagrams illustrating a communication system with user equipment relay.
Figure 1B:
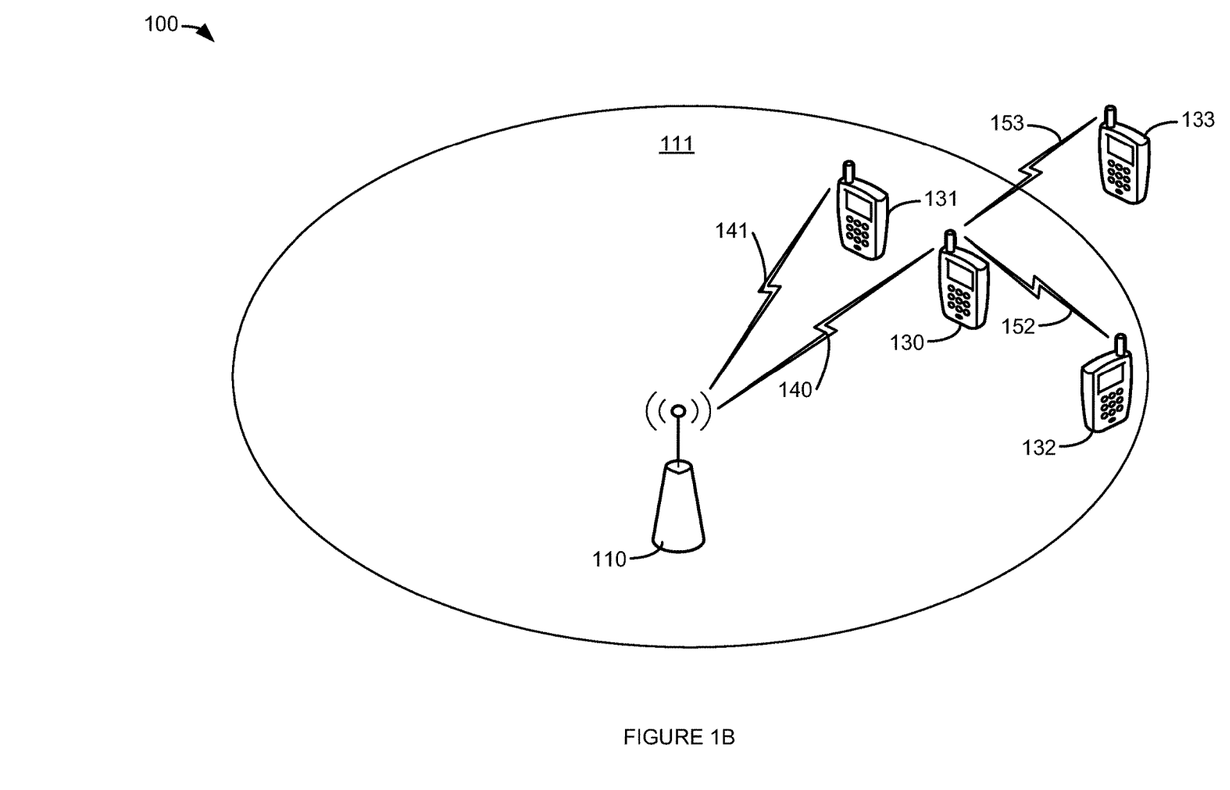

FIGS. 1A and 1B are block diagrams illustrating a communication system with user equipment relay. In FIGS. 1A and 1B, communication system 100 comprises access node 110, wireless device 130, wireless device 131, wireless device 132, and wireless device 133. A wireless device 130-133 each may also be referred to as user equipment, or UE. Access node 110 is illustrated as having coverage area 111. Wireless device 130, wireless device 131, and wireless device 132 are located within coverage area 111. Wireless device 133 is located outside coverage area 111.

In FIGS. 1A and 1B, access node 110 is illustrated as being operatively coupled to wireless device 130 via wireless link 140. Access node 110 is illustrated as being operatively coupled to wireless device 131 via wireless link 141. Thus, it should be understood that wireless device 130 and wireless device 131 each have, or can establish, direct (i.e., non-relayed) wireless links to access node 110. If configured appropriately, either wireless device 130 or wireless device 131 can be configured to function as relays for access node 110. When a wireless device 130 or 131 is acting as a relay, access node 110 may be referred to as a donor access node. FIG. 1B further illustrates communication system 100 when wireless device 130 is functioning as a relay and access node 110 is functioning as a donor access node.

In FIG. 1B, access node 110 is illustrated as being operatively coupled to wireless device 130 via wireless link 140. Access node 110 is illustrated as being operatively coupled to wireless device 131 via wireless link 141. Wireless device 130 is also illustrated as being operatively coupled to wireless device 132 via wireless link 152. Wireless device 133 is also illustrated as being operatively coupled to wireless device 133 via wireless link 153. Thus, wireless device 130 is functioning as a relay for communication between access node 110 and wireless device 132. Wireless device 130 is also functioning as a relay for communication between access node 110 and wireless device 132.

Access node 110 is a network node capable of providing wireless communication to wireless device 130, wireless device 131, wireless device 132, and/or wireless device 133. Access node 110 can be, for example, one or more of a base transceiver station, a radio base station, an eNodeB device, or an enhanced eNodeB device.

Communication system 100 is a communication network that can provide wireless communication to wireless device 130, wireless device 131, wireless device 132, and/or wireless device 133. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 may comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless link 140, wireless link 141, wireless link 152, and/or wireless link 153 can be a radio frequency, microwave, infrared, or other similar signal. Wireless link 140, wireless link 141, wireless link 152, and/or wireless link 153 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication to/from access node 110, wireless device 130, wireless device 131, wireless device 132, and/or wireless device 133, but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless device 130, wireless device 131, wireless device 132, and/or wireless device 133 may be any device, system, combination of devices, or other such communication platform capable of communicating wirelessly with access node 110. Wireless device 130 and wireless device 131 may be any device, system, combination of devices, or other such communication platform capable of functioning as a relay with access node 110 functioning as a donor access node. Wireless device 132 and wireless device 133 may be any device, system, combination of devices, or other such communication platform capable of using wireless device 130 or wireless device 131 as a relay when access node 110 functioning as a donor access node.

Wireless device 130, wireless device 131, wireless device 132, and/or wireless device 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

In an embodiment, wireless device 130 and wireless device 131 can be configured to function as relays. In an embodiment, wireless device 130 and/or wireless device 131 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access node 110 are amplified and transmitted by the relaying device (i.e., wireless device 130 and/or wireless device 131) to the device being relayed (i.e., wireless device 132 and/or wireless device 133). Likewise, RF signals received from the wireless device(s) being relayed (i.e, wireless device 132 and/or wireless device 133) are amplified and transmitted by the relaying device (i.e., wireless device 130 and/or wireless device 131) to access node 110.

A layer 2 relay device performs a decode and forward (DF) function. RF signals received from access node 110 are demodulated and decoded, then encoded and modulated again before being transmitted by the relaying device (i.e., wireless device 130 and/or wireless device 131) to the device being relayed (i.e, wireless device 132 and/or wireless device 133). Likewise, RF signals received from the device(s) being relayed (i.e, wireless device 132 and/or wireless device 133) are demodulated and decoded, then encoded and modulated again before being transmitted by the relaying device (i.e., wireless device 130 and/or wireless device 131) to access node 110.

A layer 3 relay device also performs a decode and forward function. However, a layer 3 relay device also performs additional processing (such as ciphering and/or data concatenation/segmentation/resassembly) In other words, the relaying device (i.e., wireless device 130 and/or wireless device 131) performs demodulation and decoding of the received RF signals (either uplink or downlink), processes received data, then encodes, modulates, and transmits the data to the device(s) being relayed (i.e, wireless device 132 and/or wireless device 133 for the downlink, and access node 110 for the uplink).

In an embodiment, communication system 100 (or access node 110, in particular) determines that wireless device 130 and wireless device 131 can establish direct wireless links to access node 110. Communication system 100 may determine that wireless device 130 and wireless device 131 can establish direct wireless links to access node 110 based on the existence of wireless link 140 and wireless link 141, respectively, or some other characteristic (e.g., signal strength, packet lost, SINR, modulation and coding scheme—MCS, etc.).

As communication system 100 provides communication services to wireless device 130 and wireless device 131, communication system 100 inspects packets associated with (i.e., communicated with) wireless device 130 and wireless device 131, respectively. Based on the inspection of packets communicated with wireless device 130, communication system 100 can determine a type of traffic (e.g., audio, video, web browsing, etc.) to associate with wireless device 130. Based on the inspection of packets communicated with wireless device 131, communication system 100 can determine a type of traffic (e.g., audio, video, web browsing, etc.) to associate with wireless device 131.

For example, a flow of data traffic is communicated between wireless device 130 and access node 110. Communication system 100 may select a data packet from this flow. Communication system 100 may select multiple packets over time from this flow. A data packet inspection process is then performed on the selected packet(s). The data packet inspection process may examine one or more attributes of the selected packet.

For example, the data packet inspection process may examine one or more of: (1) a user indicator that is associated with a user of the wireless device; (2) an application indicator that is associated with an application that originated the data packet; (3) a device indicator that is associated with a wireless device that originated or is going to receive the data packet; and, (4) an indicator that is associated with a wireless network resource that will, or has, carried the data packet. Additional attributes may also be examined. These attributes may be used to associate the packet with a type of traffic. In an example, attributes may be used to associate the traffic with an application that is running (and/or using communication service provided by access node 110) on the respective wireless device 130-131.

Based on the types of traffic that the packet inspection process determines for the traffic communication with wireless device 130 and wireless device 131, communication system 100 selects one of wireless device 130 and wireless device 131 to function as a relay for access node 110. For example, if wireless device 130 is associated with video streaming and wireless device 131 is associated with web browsing, communication system 100 may select wireless device 130 to function as a relay for access node 110. Communication system 100 may select wireless device 130 to function as a relay, instead of wireless device 131, because video streaming requires a relatively large amount of air-interface resources (e.g., resource blocks, etc.). Thus, wireless device 130 may already be allocated a bigger proportion of air-interface resources than wireless device 131. This greater allocation can be leveraged for the relay of communication by wireless device 130 (e.g., communication exchanged between access node 110 and wireless device 132 and wireless device 133 that is sent via wireless device 130.)

In another example, if wireless device 130 is associated with video streaming and wireless device 131 is associated with web browsing, communication system 100 may select wireless device 131 to function as a relay for access node 110. The rationale for this selection is that web browsing typically requires less bandwidth and fewer compute resources than streaming video. Thus, wireless device 131 is selected because wireless device 131 will have more computation and air-interface resources available to perform the relay functionality. In contrast, wireless device 130, which is streaming video, will need more uplink, downlink, and compute resources. These resources are seen as less likely to be available while wireless device 130 is video streaming.

In another example, if wireless device 131 is associated with a service provided by an affiliate, or owner, of communication system 100, and wireless device 130 is associated with an unaffiliated $3^{rd}$ party service, communication system 100 may select wireless device 130 to function as a relay for access node 110. Communication system 100 may select wireless device 130 to function as a relay for access node 110 in order to provide better service (e.g., throughput, quality, etc.) to the affiliated (or 'house' brand) service as compared with the service that the unaffiliated $3^{rd}$ party service receives.

Accordingly, in an embodiment, when multiple wireless devices (e.g., wireless device 130 and wireless device 131) are within a coverage area (e.g., coverage area 111) of the same access node, and are experiencing similar RF conditions (e.g., have the same or similar MCS and/or channel quality indicator—CQI, etc.), communication system 100 can use packet inspection, packet sniffing, and/or deep packet inspection (DPI) to select which wireless device is to function as a relay for other wireless devices (e.g., wireless device 132 and/or wireless device 133). Packet inspection, packet sniffing, and/or deep packet inspection can determine a traffic type, on a per wireless device 130-131 basis, to associate with each wireless device 130-131. The traffic type can be an associated application, protocol, web site, etc. that is in use by a respective wireless device 130-131.

In an embodiment, based on the traffic type (or associated application, protocol, or web site) determined by inspecting packets, access node 110 (or another element of communication system 100) can dynamically select which wireless device 130-131 to be configured to function as a relay for other wireless devices 132-133. In other words, the inspection of packets associated with wireless devices 130-131 can be considered another criteria for selecting which wireless device 130-131 to be used as a relay node. This additional criteria can be applied when more than one wireless device 130-131 can be selected to function as a relay for access node 110.

Figure 2:
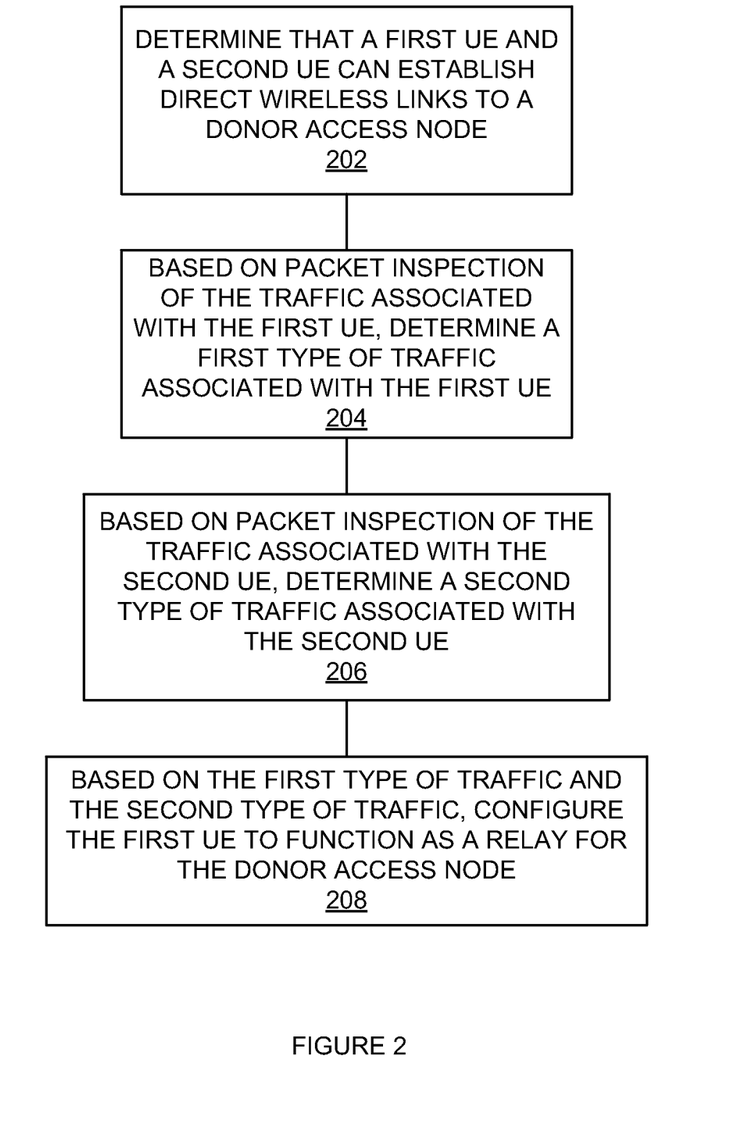
FIG. 2 is a flowchart illustrating a method of operating a communication system.

FIG. 2 is a flowchart illustrating a method of operating a communication system. The steps illustrated in FIG. 2 may be performed by one or more elements of communication system 100. It is determined that a first user equipment and a second user equipment can establish direct wireless links to a donor access node (202). For example, access node 110 may determine that both wireless device 130 and wireless device 131 can establish direct wireless links (i.e., wireless link 140 and wireless link 141, respectively) to access node 110. Wireless device 130 and wireless device 131 may be able to establish direct (i.e., un-relayed) wireless links to access node 110 because both wireless device 130 and wireless device 131 are within coverage area 111. Wireless device 130 and wireless device 131 may be experiencing similar RF conditions. These similar RF conditions may be indicated by, for example, the same or similar MCS being used by both wireless devices 130-131, signal strength indicators, SINR, CINR, CQI, etc.

Based on packet inspection of the traffic associated with the first user equipment, determine a first type of traffic associated with the first user equipment (204). For example, based on the inspection of packets flowing to/from wireless device 130, a first type of traffic is associated with wireless device 130. In other words, based on the inspection of packets exchanged between wireless device 130 and access node 110, wireless device 130 may be associated with, for example, audio streaming, website browsing, video streaming, a particular application (e.g., maps, games, backup), or the like.

Based on packet inspection of the traffic associated with the second user equipment, determine a second type of traffic associated with the second user equipment (206). For example, based on the inspection of packets flowing to/from wireless device 131, a second type of traffic is associated with wireless device 131. In other words, based on the inspection of packets exchanged between wireless device 131 and access node 110, wireless device 131 may be associated with, for example, audio streaming, website browsing, video streaming, a particular application (e.g., maps, games, backup), or the like.

Based on the first type of traffic and the second type of traffic, the first user equipment is configured to function as a relay for the donor access node (208). For example, based on the type of traffic associated with wireless device 130 by the packet inspection process, and the type of traffic associated with wireless device 131 by the packet inspection process, access node 110 may configure wireless device 130 to function as a relay for access node 110. For example, as described herein, if wireless device 130 is associated with video streaming, and wireless device 131 is associated with web browsing, access node 110 may select wireless device 130 to function as a relay for access node 110. In another example, if wireless device 131 is associated with video streaming, and wireless device 130 is associated with web browsing, access node 110 may select wireless device 130 to function as a relay for access node 110. This selection may be based on different reasoning than previous examples. In another example, if wireless device 131 is associated with a service provided by an affiliate, or owner, of communication system 100, and wireless device 130 is associated with an unaffiliated $3^{rd}$ party service, communication system 100 may select wireless device 130 to function as a relay for access node 110 in order to favor the affiliated (or owned) service over $3^{rd}$ parties services (or applications, etc.) by providing the affiliated service with better throughput, quality, packet loss, or the like.

Figure 3:
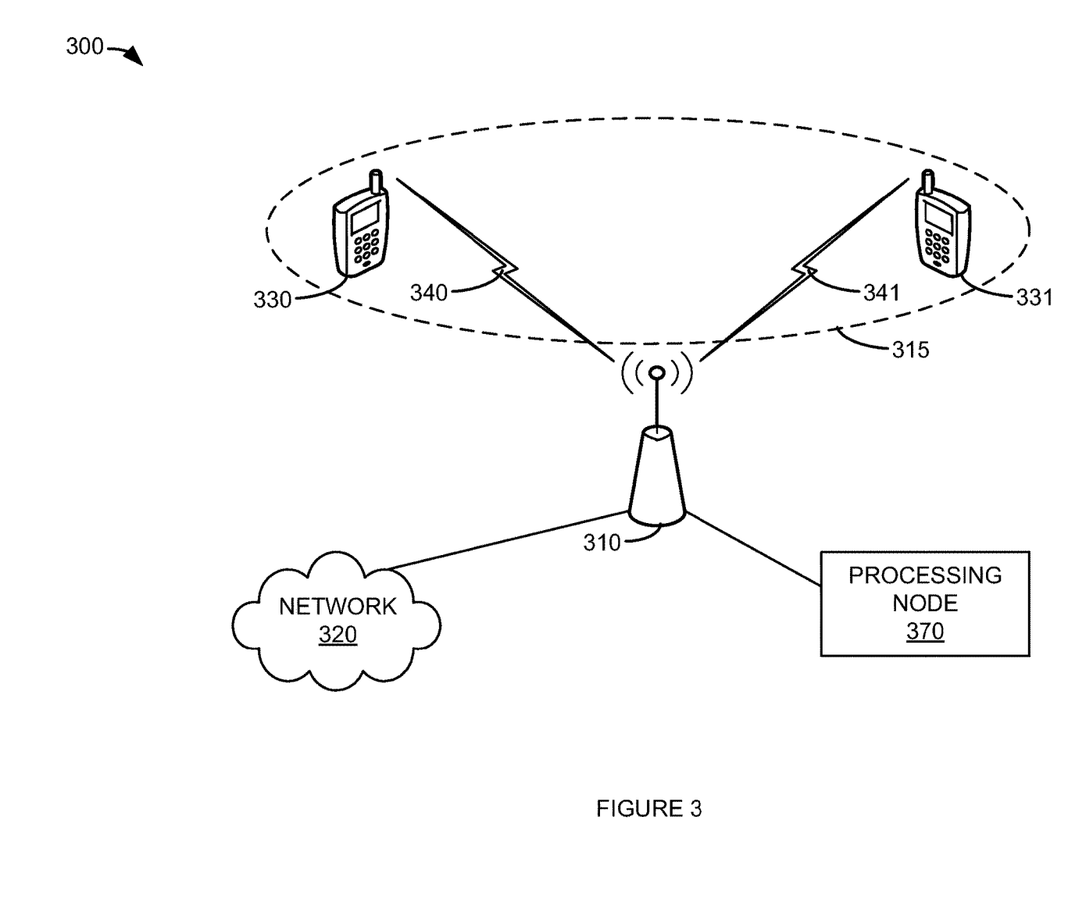
FIG. 3 is a block diagram of a communication system.

FIG. 3 is a block diagram of a communication system. In FIG. 3, communication system 300 comprises access node 310, network 320, wireless device 330, wireless device 331, and processing node 370. Wireless device 330 and wireless device 331 are experiencing similar air-interface (e.g., RF signal strength, MCS, or CQI, etc.) conditions within area 315. Network 320 is operatively coupled to access node 310. Processing node 370 is operatively couple to (or is a part of) access node 310. Wireless device 330 is operatively coupled to access node 310 via wireless link 340. Wireless device 331 is operatively coupled to access node 310 via wireless link 341.

Wireless device 330 and wireless device 331 may be any device, system, combination of devices, or other such communication platform capable of communicating with access node 310, and capable of functioning as a relay node for communication with access node 310. Each of wireless devices 330-331 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with access node 310 via wireless links. Other types of communication platforms are possible.

In an embodiment, wireless device 330 and wireless device 331 can be configured to function as relays. In an embodiment, wireless device 330 and/or wireless device 331 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access node 310 are amplified and transmitted by the relaying device (i.e., wireless device 330 and/or wireless device 331) to the device being relayed. Likewise, RF signals received from the device(s) being relayed are amplified and transmitted by the relaying device (i.e., wireless device 330 and/or wireless device 331) to access node 310.

A layer 2 relay device performs a decode and forward (DF) function. RF signals received from access node 310 are demodulated and decoded, then encoded and modulated again before being transmitted by the relaying device (i.e., wireless device 330 and/or wireless device 331) to the device being relayed. Likewise, RF signals received from the device(s) being relayed are demodulated and decoded, then encoded and modulated again before being transmitted by the relaying device (i.e., wireless device 330 and/or wireless device 331) to access node 310.

A layer 3 relay device also performs a decode and forward function. However, a layer 3 relay device also performs additional processing (such as ciphering and/or data concatenation/segmentation/reassembly). In other words, the relaying device (i.e., wireless device 330 and/or wireless device 331) performs demodulation and decoding of the received RF signals (either uplink or downlink), processes received data, then encodes, modulates, and transmits the data to the device(s) whose transmission is being relayed.

Access node 310 may be any wireless system that can function as a donor access node and provide communication connectivity to network 320. Examples of access nodes that may be utilized include, base transceiver stations (BTSs), radio base stations (RBSs), Node B, enhanced Node B (eNBs) and others. Access nodes may include a number of elements known to those skilled in the art comprising a transceiver, power amplifier, combiner, duplexer, antenna and control function.

Network 320 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Network 320 may also comprise a wireless network, including base stations, wireless communication nodes, telephony switches, internet routers, network gateways, computer systems, communication links, or some other type of communication equipment, and combinations thereof. Wired network protocols that may be utilized by network 320 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 310 and network 320 which are omitted for clarity, including additional processing nodes, routers, gateways, and physical and/or wireless data links for carrying data among the various network elements.

Processing node 370 inspects packets associated with (i.e., communicated with) wireless device 330 and wireless device 331, respectively. Based on the inspection of packets communicated with wireless device 330, processing node 370 can determine a type of traffic (e.g., audio, video, web browsing, etc.) to associate with wireless device 330. Based on the inspection of packets communicated with wireless device 331, processing node 370 can determine a type of traffic (e.g., audio, video, web browsing, etc.) to associate with wireless device 331.

For example, a flow of data traffic is communicated between wireless device 330 and access node 310. Processing node 370 may inspect a data packet from this flow. Processing node 370 may select multiple packets over time from the flow. A data packet inspection process is then performed on the selected packet(s). The data packet inspection process may examine one or more attributes of the selected packet(s).

For example, the data packet inspection process may examine one or more of: (1) a user indicator that is associated with a user of the wireless device; (2) an application indicator that is associated with an application that originated the data packet; (3) a device indicator that is associated with a wireless device that originated or is going to receive the data packet; and, (4) an indicator that is associated with a wireless network resource that will, or has, carried the data packet. Additional attributes may also be examined. These attributes may be used to associate the packet with a type of traffic. In an example, attributes may be used to associate the traffic with an application that is running (and/or using communication service provided by access node 310) on the respective wireless device 330-331.

One of wireless device 330 and wireless device 331, is selected by processing node 370 to be configured to function as a relay for access node 310. For example, if wireless device 330 is associated with video streaming and wireless device 331 is associated with web browsing, processing node 370 may select wireless device 330 to function as a relay for access node 310. Processing node 370 may select wireless device 330 to function as a relay instead of wireless device 331 because video streaming requires a greater amount of air-interface resources (e.g., resource blocks, etc.). Thus, wireless device 330 will likely be allocated a bigger proportion of air-interface resources than wireless device 331. This greater allocation can be leveraged for the relay of communication by wireless device 330.

In another example, wireless device 330 is associated with video streaming and wireless device 331 is associated with web browsing. Processing node 370 may select wireless device 331 to be configured to function as a relay for access node 310. The rationale for this selection by processing node 370 may be based on web browsing typically requiring less bandwidth and computer resources than streaming video. Thus, wireless device 331 is selected because wireless device 331 will likely have more compute and air-interface resources available than wireless device 330 to perform the relay functionality. In contrast, wireless device 330, which is streaming video, will likely need more uplink, downlink, and compute resources.

In another example, processing node 370 may select the wireless device 330-331 to be configured as a relay in order to favor a particular application, protocol, etc. The favored application etc., may be associated with products and/or services that communication system 300 is configured to provide improved service to.

For example, if wireless device 331 is associated with a service provided by an affiliate, or owner, of communication system 300, and wireless device 330 is associated with an unaffiliated $3^{rd}$ party service, processing node 370 may select wireless device 330 to function as a relay for access node 310. Processing node 370 may select wireless device 330 to function as a relay for access node 310 in order to provide a better service (e.g., throughput, quality, etc.) experience to the affiliated (or 'house' brand) service than the quality experienced by the unaffiliated $3^{rd}$ party service.

Accordingly, in an embodiment, when multiple wireless devices (e.g., wireless device 330 and wireless device 331) are experiencing similar air-interface conditions (e.g., within area 315) from the same access node, Processing node 370 can use packet inspection, packet sniffing, and/or deep packet inspection to select which wireless device 330-331 is to be configured to function as a relay to/from donor access node 310. Packet inspection, packet sniffing, and/or deep packet inspection can determine a traffic type, on a per wireless device 330-331 basis, to associate with each wireless device 330-331. The traffic type can be an associated application, protocol, web site, etc. that is in use by a respective wireless device 330-331.

Accordingly, processing node 370, based on the traffic type (or associated application, protocol, or web site) determined by inspecting packets, can dynamically select which wireless device 330-331 to configure to function as a relay for other wireless devices (not shown in FIG. 3.) The inspection of packets associated with wireless devices 330-331 provides another criteria for selecting which wireless device 330-331 to be used as a relay node. This additional criteria can be applied when more than one wireless device 330-331 has suitable conditions (and/or air-interface condition indicators) to be selected to function as a relay for access node 310.

Figure 4:
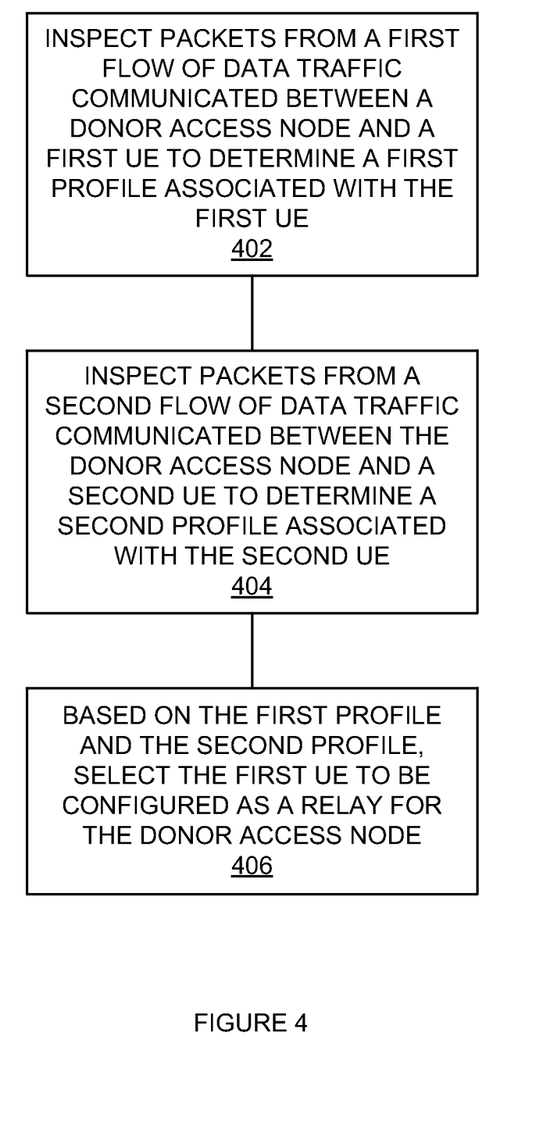
FIG. 4 is a flowchart illustrating a method of selecting user equipment to be a relay for a donor access node.

FIG. 4 is a flowchart illustrating a method of operating a communication system. The steps illustrated in FIG. 4 may be performed by one or more elements of communication system 100 and/or communication system 300. Packets from a first flow of data traffic communicated between a donor access node and a first user equipment are inspected to determine a first profile associated with the first user equipment (402). For example, processing node 370 may inspect packets flowing between access node 310 and wireless device 330. This inspection can be used to determine the profile (e.g., application, protocol, web site, or the like) to associate with wireless device 330.

In order to determine a profile to associate with wireless device 330, the packet inspection process may examine one or more attributes of the selected packets. The inspection process may examine attributes that include, but are not limited to, one or more of: (1) a user indicator that is associated with a user of the wireless device; (2) an application indicator that is associated with an application that originated the data packet; (3) a device indicator that is associated with a wireless device that originated or is going to receive the data packet; and, (4) an indicator that is associated with a wireless network resource that will, or has, carried the data packet. Additional attributes may also be examined.

Packets from a second flow of data traffic communicated between a donor access node and a second user equipment are inspected to determine a second profile associated with the second user equipment (402). For example, processing node 370 may inspect packets flowing between access node 310 and wireless device 331. This inspection can be used to determine the profile (e.g., application, protocol, web site, or the like) to associate with wireless device 330.

Based on the first profile and the second profile, the first user equipment is selected to be configured as a relay for the donor access node (406). For example, based on the profile associated with wireless device 330, and the profile associated with wireless device 331, processing node 370 may select wireless device 330 to be configured as a relay for donor access node 310.

Figure 5:
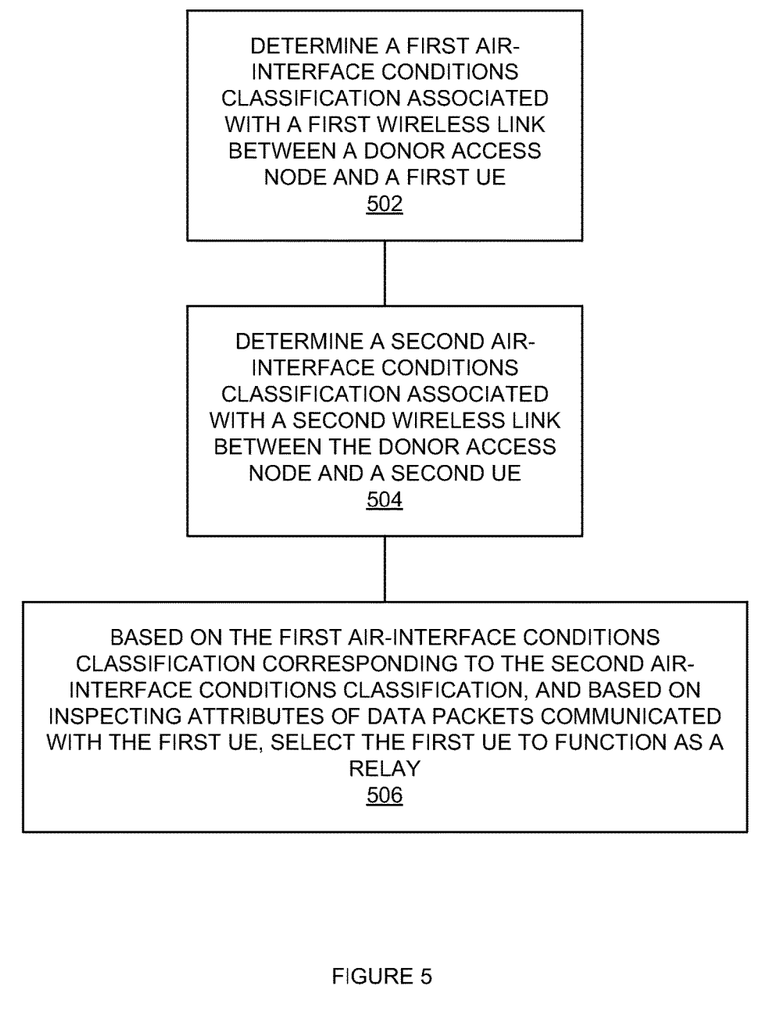
FIG. 5 is a flowchart illustrating a method of selecting user equipment to function as a relay.

FIG. 5 is a flowchart illustrating a method of selecting user equipment to function as a relay. The steps illustrated in FIG. 5 may be performed by one or more elements of communication system 100 and/or communication system 300. A first air-interface conditions classification associated with a first wireless link between a donor access node and a first user equipment is determined (502). For example, access node 310 may determine an indicator of air-interface conditions for wireless link 340 that reflects the RF conditions being experienced by wireless device 330. This classification may be based on, for example, the MCS being used by wireless device 330, signal strength indicators reported by wireless device 330 and/or access node 310, SINR, CINR, CQI, etc.

A second air-interface conditions classification associated with a second wireless link between a donor access node and a second user equipment is determined (504). For example, access node 310 may determine an indicator of air-interface conditions for wireless link 341 that reflects the RF conditions being experienced by wireless device 331. This classification may be based on, for example, the MCS being used by wireless device 331, signal strength indicators reported by wireless device 331 and/or access node 310, SINR, CINR, CQI, etc.

Based on the first air-interface conditions classification corresponding to the second air-interface conditions classification, and based on inspecting attributes of data packet communicated with the first user equipment, the first user equipment is selected to function as a relay (506). For example, based on the air-interface conditions classification associated with wireless device 330 corresponding to the air-interface conditions classification associated with wireless device 331 (e.g., same or similar MCS, SINR, etc. for both wireless devices 330-331), the attributes of packets communicated with (at least) wireless device 330 are inspected to determine whether to select wireless device 330.

The air interface conditions classifications for wireless device 330 and wireless device 331 need not be precisely the same value. For example, the wireless devices may be deemed to have corresponding air interface conditions classifications if their MCS, SINR, CQI, etc. values are within threshold values or a band of values of one another. A CQI value of 11 for wireless device 330 may be considered to have a comparable air interface conditions classification as wireless device 331 that is operating with a CQI value of 12. Or, wireless devices 330 and 331 operating at the same modulation type (i.e. 16-QAM), but using different coding rates (2/3, 3/4, 5/6) may be considered having corresponding air interface conditions classifications. Further, ranges or bands of corresponding CQI's, MCS's and the like may be determined by the network operator to signify corresponding air interface conditions classifications.

If the inspected packets meet a criteria for selection, then wireless device 330 is selected to be configured to function as a relay for access node 310. For example, the packets communicated with wireless device may indicate that wireless device 330 is web surfing and not streaming video, thus meeting a criteria for selecting wireless device 330 to function as a relay. In another example, the packets communicated with wireless device 330 may indicate that relatively few air-interface resources are being used by wireless device 330. This indication may be used as the criteria for selecting wireless device 330 to function as a relay. In another example, the packets communicated with wireless device 330 and the packets communicated with wireless device 331 may indicate that wireless device 330 is using less air-interface bandwidth, or fewer compute resources, than wireless device 331. This comparison may be used as the criteria for selecting wireless device 330 instead of wireless device 331 to function as a relay.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 and/or communication system 300 may be, comprise, or include computers systems and/or processing nodes. This includes, but is not limited to: access node 110, wireless devices 130-133, access node 310, wireless devices 330-331, processing node 370, and/or network 320.

Figure 6:
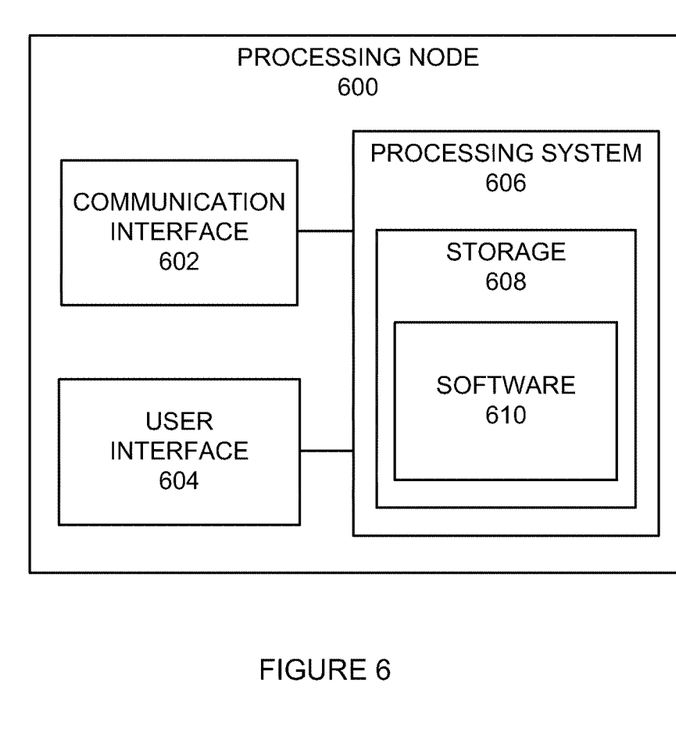
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An example of processing node 600 includes access node 110. Processing node 600 can also be an adjunct or component of a network element, such as an element of access node 110, wireless devices 130-133, access node 310, wireless devices 330-331, processing node 370, and/or network 320, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
establishing direct wireless links between a donor access node and each of a first user equipment (UE) and a second UE;
based on packet inspection of traffic associated with the first UE, determining a first type of traffic associated with the first UE, wherein the first type of traffic comprises at least a first application indicator associated with a first application running on the first UE;
based on packet inspection of traffic associated with the second UE, determining a second type of traffic associated with the second UE, wherein the second type of traffic comprises at least a second application indicator associated with a second application running on the second UE; and,
based on the first type of traffic and the second type of traffic, configuring the first UE to relay traffic between the donor access node and a third UE;
wherein the third UE attaches to the first UE.

2. The method of claim 1, further comprising:
determining that the first UE and the second UE are associated with corresponding air-interface conditions.

3. The method of claim 2, wherein the corresponding air-interface conditions include the first UE and the second UE using a modulation and coding scheme (MCS) within a MCS threshold type of one another.

4. The method of claim 2, wherein the corresponding air-interface conditions include the first UE and the second UE being associated with a channel quality indicator (CQI) within a CQI threshold value of one another.

5. The method of claim 1, wherein the first type of traffic further comprises a user indicator associated with the first UE.

6. The method of claim 1, wherein the first type of traffic is associated with a packet type.

7. The method of claim 1, wherein the first type of traffic is associated with communication with a type of internet resource.

8. A communication system, comprising:
a donor access node configured to establish direct wireless links with a first user equipment (UE) and a second UE, the first UE and the second UE being associated with corresponding air-interface conditions; and,
a processor configured to:
inspect packets from a first flow of data traffic communicated between the donor access node and the first UE to determine a first profile associated with the first UE, wherein the first flow of data traffic comprises at least a first application indicator associated with a first application running on the first UE;
inspect packets from a second flow of data traffic communicated between the donor access node and the second UE to determine a second profile associated with the second UE, wherein the second flow of data traffic comprises at least a second application indicator associated with a second application running on the second UE;
based on the first profile and the second profile, configure the first UE to relay traffic between the donor access node and a third UE;
wherein the third UE attaches to the first UE.

9. The communication system of claim 8, wherein the corresponding air-interface conditions include the first UE and the second UE using a modulation and coding scheme (MCS) within a MCS threshold type of one another.

10. The communication system of claim 8, wherein the corresponding air-interface conditions include the first UE and the second UE being associated with a channel quality indicator (CQI) within a CQI threshold value of one another.

11. The communication system of claim 8, wherein at least one of the first and the second flows of traffic comprise a user indicator.

12. The communication system of claim 8, wherein at least one of the first profile and the second profile is associated with a type of network traffic.

13. The communication system of claim 8, wherein at least one of the first profile and the second profile is associated with communication with a type of internet resource.

14. A method of operating a communication system, comprising:
determining a first air-interface conditions classification associated with a first wireless link between a donor access node and a first user equipment (UE);
determining a second air-interface conditions classification associated with a second wireless link between a donor access node and a second user equipment (UE);

based on the first air-interface conditions classification corresponding to the second air-interface conditions classification, and based on inspecting attributes of data packets communicated with the first and second UEs, configuring the first UE to relay traffic between the donor access node and a third UE;

wherein the third UE attaches to the first UE, and wherein the attributes of data packets comprise an application indicator associated with an application running on each of the first and second UEs.

15. The method of claim 14, wherein the attributes of data packets further comprise a user indicator associated with each of the first and second UEs.

16. The method of claim 14, wherein the inspecting attributes of data packets communicated with the first user equipment is used to associate the first UE with a data protocol being communicated between the donor access node and the first UE.

17. The method of claim 14, wherein the inspecting attributes of data packets communicated with the first user equipment is used to associate the first UE with a website being accessed by the first UE.

18. The method of claim 14, wherein the selecting of the first user equipment to function as the relay is further based on inspecting attributes of data packets communicated with the second user equipment.

19. The method of claim 14, wherein first air-interface conditions classification and the second air-interface condition classifications are based on modulation and coding schemes being used by the first UE and the second UE, respectively.

20. The method of claim 19, wherein first air-interface conditions classification and the second air-interface conditions classification are further based on channel quality indicators reported by the first UE and the second UE, respectively.

* * * * *